United States Patent [19]

Tominaga et al.

[11] 4,315,236
[45] Feb. 9, 1982

[54] PRESSURE SENSOR

[75] Inventors: Tamotsu Tominaga; Teruyoshi Mihara, both of Yokohama; Takeshi Oguro, Yokosuka; Masami Takeuchi, Kokubunji, all of Japan

[73] Assignee: Nissan Motor Company, Limited, Kanagawa, Japan

[21] Appl. No.: 109,476

[22] Filed: Jan. 4, 1980

[30] Foreign Application Priority Data

Jan. 11, 1979 [JP] Japan ............................ 54-945

[51] Int. Cl.³ .................................................. G01L 1/22
[52] U.S. Cl. .......................................... 338/4; 73/726; 338/42
[58] Field of Search ................... 338/2, 3, 4, 5, 42; 73/720, 721, 726, 727; 357/26

[56] References Cited

U.S. PATENT DOCUMENTS

| | | | |
|---|---|---|---|
| 3,289,134 | 11/1966 | Laimins et al. ........... | 73/326 X |
| 4,040,297 | 8/1977 | Karsmakers et al. .......... | 338/4 X |
| 4,102,210 | 7/1978 | Coustori et al. ............ | 73/727 |
| 4,129,042 | 12/1978 | Rosvold ................... | 73/727 |
| 4,137,516 | 1/1979 | Shaw et al. ............... | 338/67 |

FOREIGN PATENT DOCUMENTS 2552393 8/1976 Fed. Rep. of Germany .
1406891 9/1975 United Kingdom .
1530141 10/1978 United Kingdom .

*Primary Examiner*—C. L. Albritton
*Attorney, Agent, or Firm*—Schwartz, Jeffery, Schwaab, Mack, Blumenthal & Koch

[57] ABSTRACT

A sensor block is disposed within a package and includes a semiconductor diaphragm and a circumferential support bonded to the inside of the package. The semiconductor diaphragm is provided with at least one diffused resistor layer formed thereon as a pressure-sensitive element, one surface of the diaphragm being subjected to a reference pressure whereas the other surface is subjected to a fluid pressure to be measured. A diaphragm breakage detecting element including an electrical conductor filament is provided zigzagging back and forth laterally across the boundary between the diaphragm and the circumferential support, the point subject to maximum stress, the conductor filament material being of substantially the same mechanical strength as the diaphragm material, so that, when the diaphragm is broken, the conductor filament is also broken, thus allowing immediate indication of the diaphragm breakage. The detecting element may include a U-shaped protrusion extending radially inwards, substantially reaching the center of the diaphragm in order to detect breakage of the diaphragm at the center thereof, where a second maximum stress occurs.

13 Claims, 10 Drawing Figures

PRESSURE SENSOR

BACKGROUND OF THE INVENTION

The present invention relates to a diaphragm type pressure sensor using a piezoresistivity effect, and more particularly to a pressure sensor having a diaphragm on which diffused resistors are formed as a sensing element that measures pressure exerted on the diaphragm, using the piezoresistivity effect. The present invention relates even more particularly to such a diaphragm type pressure sensor provided with a detector for sensing diaphragm breakage.

A known semiconductor pressure sensor includes a silicon diaphragm whose one surface is provided with a diffused resistor thereon which varies in resistance due to stress from pressure applied thereto, thereby converting the applied pressure to a corresponding electric signal. This sensor is relatively small and has excellent sensitivity. Integrated circuit manufacturing techniques allow many such uniform characteristic sensors to be easily produced. These excellent sensor features have been brought to many persons' attention so that research on this sensor towards practical use has been carried out in many factories and research institutes. For example, in the field of automobile manufacturing, applications are being made toward the measurement of intake air pressure of an engine for superior accuracy and response.

However, one problem with this sensor is that its diaphragm, made of a semiconductor material such as silicon, is liable to be broken due to its fragility by a sudden negative change in pressure exerted on the diaphragm which sudden change is caused for example by a driver suddenly stepping on the accelerator pedal when the sensor is used for measuring the pressure of intake air into an engine, or by a sudden change in exhaust gas pressure caused by an afterburner when the sensor is used with an exhaust gas recirculation system. Further, the diaphragm tends to deteriorate due to aging thereof. Thus, when using such a sensor with an engine control system, it is necessary to detect diaphragm breakage at as early a stage of breakage as possible in order to cope with the same and ensure safe automobile driving.

SUMMARY OF THE INVENTION

It is therefore an object of the present invention to provide a semiconductor pressure sensor with a means of detecting semiconductor diaphragm breakage at an early stage of breakage.

Another object of the present invention is to provide a compact semiconductor pressure sensor with means for detecting semiconductor diaphragm breakage at an early breakage stage.

Other objects, features and advantages of the present invention will be more apparent from the following description when taken in conjunction with the accompanying drawings which are only for illustration.

DETAILED DESCRIPTION OF THE PREFERRED EMBODIMENTS

Figure 1A:
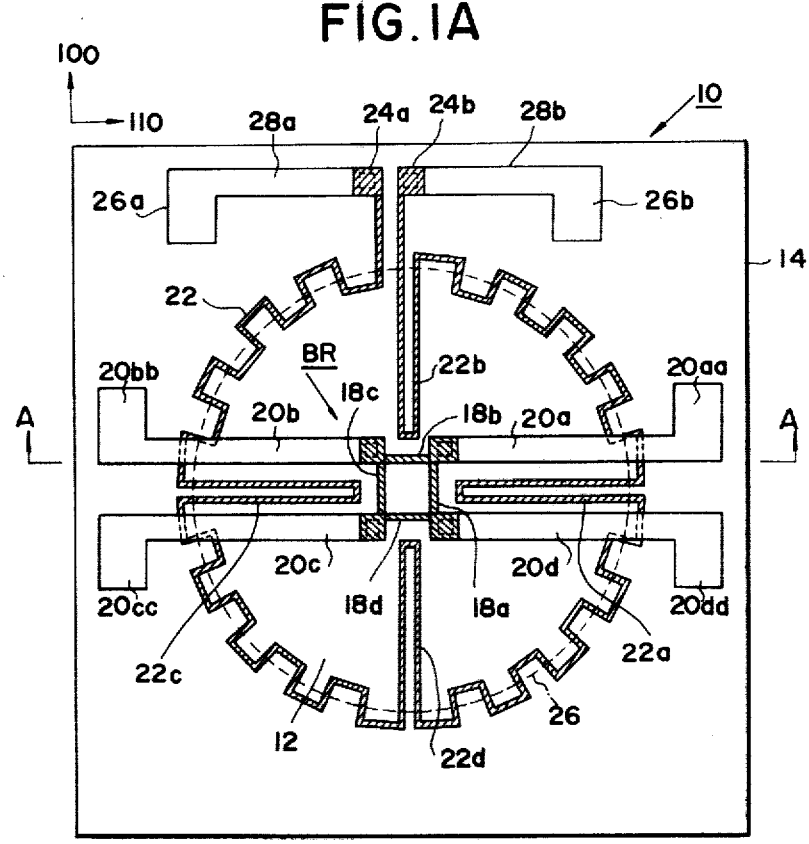
FIG. 1A is a partially cross-sectional plan view of a sensor block of a pressure sensor according to the present invention.

Any one reference numeral designates the same or corresponding part or element throughout the drawings.

Figure 1B:
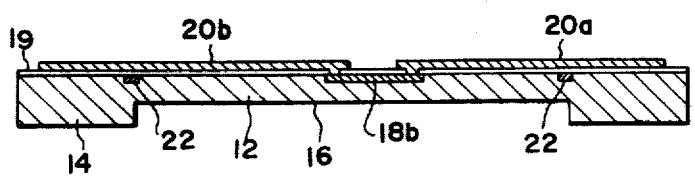
FIG. 1B is a cross-sectional view taken along the line A—A in FIG. 1A.

Referring to FIGS. 1A and 1B, a semiconductor sensor block 10 according to the present invention includes a thin circular diaphragm 12 and a thicker circumferential support 14, which may be obtained by forming a recess 16 in one surface of a square plate chip of single-crystal silicon, using etching techniques. Formed centrally on the outer, or front, surface of the diaphragm 12 are diffused resistors 18a, 18b, 18c, and 18d acting as a pressure-sensitive element, using a silicon dioxide ($SiO_2$) film 19 formed as a mask on the outer surface of the diaphragm, the resistors being arranged and connected to form a square. Hatching denotes portions of the resistors 18a, 18b, 18c and 18d underlying the silicon dioxide film 19. This applies to FIGS. 2A and 3A. In this particular embodiment, the silicon chip is of an N-type and the diffused resistors are of a P-type impurity layer. However, if the silicon chip is of a P-type, the diffused resistors should be of an N-type impurity layer. The lengthwise directions of the opposing resistors 18b, 18d coincide with a crystal axis of the silicon chip (for example $<110>$) while the lengthwise direction of the other pair of opposing resistors 18a, 18c is perpendicular (for example $<100>$) to the crystal axis. The diffused resistors 18a to 18d are electrically connected at the corners of the square formed by the resistors to four lead strips 20a, 20b, 20c and 20d made of aluminum evaporated on the silicon dioxide film 19, a pair of opposing lead strips 20a, 20d extending from the corresponding corner points, outwards parallel to each other and another pair of opposing lead strips 20b, 20c extending from the corresponding corner points outwards parallel to each other opposite to the direction in which the lead strips 20a, 20d extend, thereby forming a bridge BR. When a constant voltage is applied to inputs, for example 20aa, 20cc of the bridge, an electric output, corresponding to the pressure imparted on the diaphragm and representing the difference in distortion and therefore resistance between the diffused resistors, is obtained from output terminals, for example 20bb, 20dd of the bridge BR. The pattern consisting of the lead strips 20a to 20d and the diffused resistors 18a to 18d illustrated in FIGS. 1A and 1B is only one example and not limited to this pattern.

An element for detecting diaphragm breakage, designated by 22 in FIGS. 1A and 1B, is composed of a P-type diffused layer filament in the silicon chip because the silicon chip is of an N-type in this particular embodiment. However, if the chip is of a P-type, the detecting element 22 should be of an N-type. Hatching denotes portions of the detecting element 22 underlying the silicon dioxide film 19, as in the case of the resistors 18a, 18b, 18c and 18d. This applies to FIG. 3A. This detecting element 22 can be formed by diffusion techniques simultaneously with the formation of the diffused resistors 18a to 18d. When seen from above, the detecting element 22 zigzags back and forth laterally across the circular boundary 26 between the thin diaphragm 12 and its circumferential support 14, said boundary not being visible from above and thus shown by a broken line, while generally following the curve of the boundary line all the way around from point 24a to point 24b. Four U-shaped protrusions 22a, 22b, 22c, 22d are disposed equally spaced circumferentially around the circular detecting element 22 projecting radially inwards, substantially reaching, but not contacting, the corresponding diffused resistors 18a to 18d, respectively; a pair of opposite U-shaped protrusions 22a, 22c are disposed between the lead strips 20a, 20d and between the lead strips 20b, 20c respectively, in parallel. Both ends 24a and 24b of the detecting element 22 are electrically connected to lead terminals 26a and 26b respectively, by lead strips 28a, 28b made of aluminum evaporated on the film 19 and extending oppositely away from each other along the edge of the chip. The film 19 is provided extending between the detecting element 22 and each of the lead strips 20a to 20d so as to electrically isolate the element 22 from the lead strips in the area where the lead strips and the element intersect.

Considering the distribution of the stress created on the diaphragm surface when the pressure at the portion of the diaphragm on which the lead strips are formed is maintained under the reference (vacuum) value while the other or back surface of the diaphragm is subjected to pressure (negative) to be measured, the part of the diaphragm which is subjected to maximum stress is the boundary area 26 between the diaphragm 12 and the circumferential support 14. Another part, subject to the second largest stress is around the center of the diaphragm. Accordingly, if breakage should take place in the diaphragm, it will be in either or both of those areas. The pattern of the detecting element 22, shown in FIG. 1, is formed for the above reasons. Even a small crack in either or both of the two areas of the diaphragm can be immediately detected by the detecting element 22.

Figure 2A:
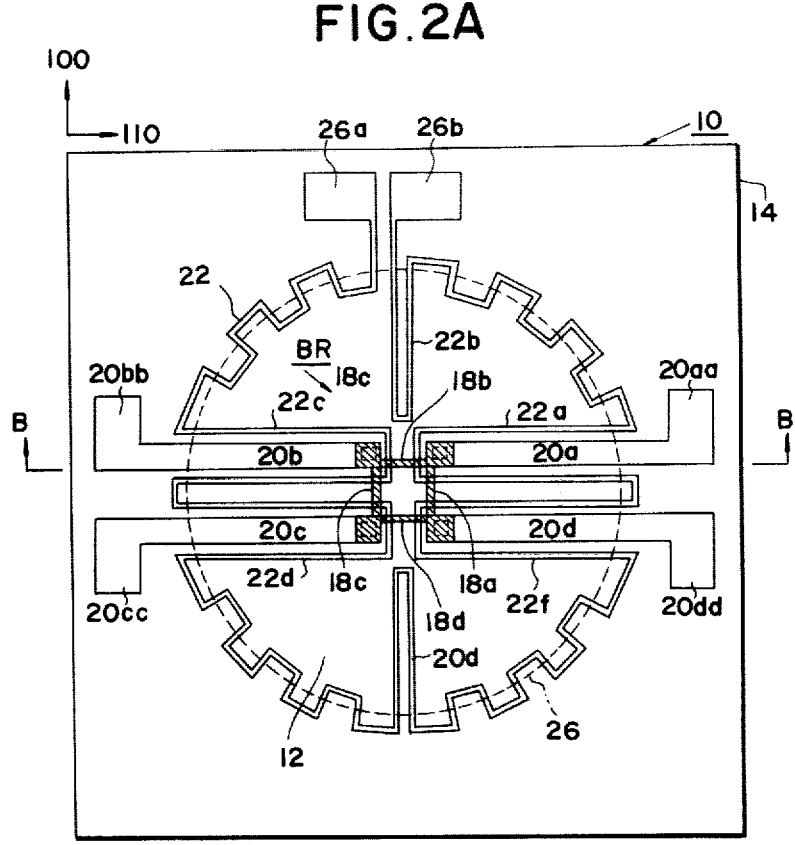
FIG. 2A is a partially cross-sectional plan view of a modification of the present invention.
Figure 2B:
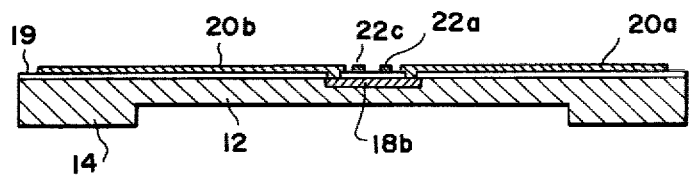
FIG. 2B is a cross-sectional view taken along the line B—B in FIG. 2A.

In FIGS. 2A and 2B, a modification of the present invention is shown, which is of the same construction as the embodiment in FIG. 1 except that a detecting element 22 is made of a film of an electrically conductive material such as aluminum or gold evaporated on the surface of a diaphragm 12 while the detecting element 22 has six U-shaped protrusions 22a, 22b, 22c, 22d, 22e, 22f projecting inwards; two protrusions 22a, 22f surround parallel lead strips 20a, 20d, respectively, another two U-shaped protrusions 22c, 22d, project inwards opposite the two protrusions 22a, 22f surrounding the lead strips 20b, 20c and these protrusions 22a, 22c, 22d, 22f, intersect the diffused resistors 18a to 18d at the end portions of the protrusions 22a, 22c, 22d, 22f: the long legs of the U-shaped protrusions and the crossbar portions joining the long legs thereof pass over the respective branches of the pressure sensor bridge. A silicon dioxide film 19 isolates the resistors 18a to 18d. The protrusions 22a to 22f can be formed by the evaporation method mentioned above simultaneously with the forming of the lead strips 20a to 20d.

Figure 3A:
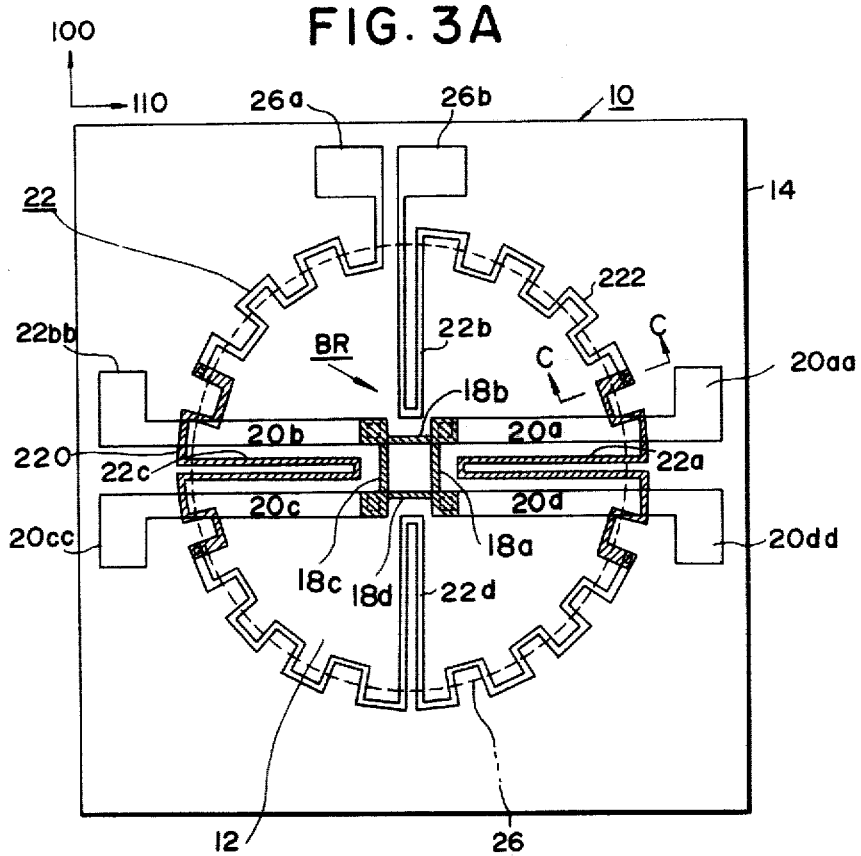
FIG. 3A is a partially cross-sectional plan view of another modification of the present invention.
Figure 3B:
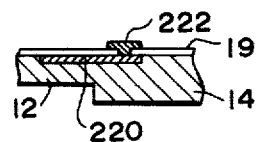
FIG. 3B is a cross-sectional view taken along the line C—C in FIG. 3A.

Shown in FIGS. 3A and 3B is another modification of the present invention which is of the same construction as the embodiment of FIG. 1 except that the detecting element 22 is composed of a diffused layer portion 220 and an evaporated film portion 222 electrically connected thereto. In this particular modification, as in the preceding embodiment and modification, the detecting element 22 and the diffused resistors 18a to 18d intersect with a silicon dioxide film 19 formed therebetween, and diffused lead strips 20a to 20d are used for connecting the diffused resistors 18a to 18d to an outside circuit, not shown. However, the pattern of the breakage detecting element and method of forming the same are a problem to be solved in terms of the relationship between the detecting element, other lead strips or the like on the semiconductor diaphragm and the manufacturing efficiency of the pattern of the detecting element.

Figure 4:
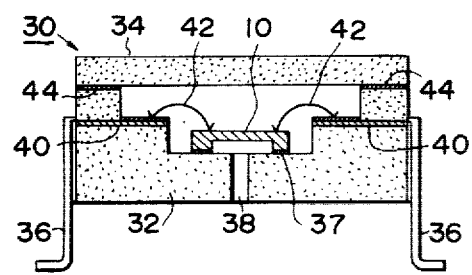
FIG. 4 is a cross-sectional side view of a package in which the sensor block shown in any of FIGS. 1 to 3 is accommodated.
Figure 5:
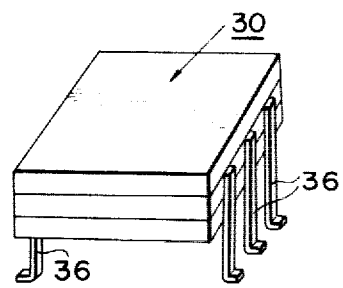
FIG. 5 is a perspective view of the package in FIG. 4.

Referring to FIGS. 4 and 5, a package 30 in which the semiconductor sensor block 10 is accommodated is composed of a mounting base 32 on which the sensor block 10 is mounted, a lid 34 mounted on the base and a plurality of lead frames 36 mounted on opposite sides of the base. For the base 32 and the lid 34, materials which have substantially the same coefficient of linear thermal expansion as the silicon chip composing the sensor block 10 of a material such as mullite, zircon, Pylex (trademark) glass or the like, can be used. The sensor block 10 and the base 32 are bonded by means of an Au-Si (gold-silicon) eutectic alloy 37. Reference numeral 38 denotes a through hole in the center of the base 32 through which a fluid pressure to be measured is introduced against the diaphragm of the sensor block 10. Metallized wires of W (tungsten), Mo-Mn (molybdenum-manganese) 40 or the like extend over the base 32 and are electrically connected to respective lead frames 36. These wires 40 are plated with gold except for the unexposed portions thereof. These metallized wires 40, the diffused resistors and the lead terminals deriving from the detecting element are electrically connected through gold wires 42, respectively. The lid 34 is bonded to the base 32 by a brazing material 44 such as, for example, a low melting glass, Au-Sn (gold-stannum) alloy after the sensor block 10 is mounted on the base 32. This bonding is carried out within a vacuum chamber so that the surface of the diaphragm on which the diffused resistors 18a to 18d are formed is kept in a vacuum. The inside space of the package 30 is then hermetically sealed.

Figure 6:
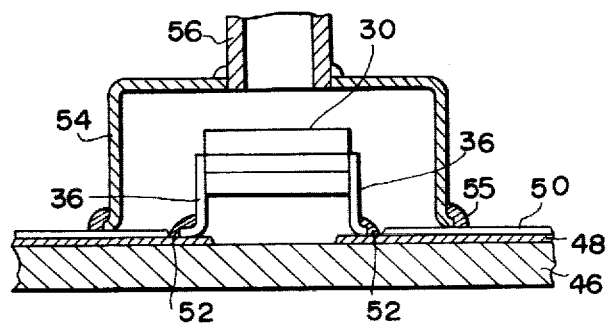
FIG. 6 is a cross-sectional side view of the package mounted on a substrate and further covered by a housing.

The package 30 thus constructed is mounted on a substrate 46 of aluminum, for example, as shown in FIG. 6. Part of printed conductors 48 of a signal processor circuit formed on the substrate 46 and not covered by the glass insulation layer 50 and the lead frames 36 of the package 30 are bonded to each other by solder 52 thereby supporting the package 30 on the substrate 46. A cap 54 is secured to the substrate 46 by an adhesive 55 so as to cover the package 30 and the cap 54 has a pressure introducing pipe 56 connected to a hole in the cap 54 so that the fluid pressure to be measured is introduced from this pipe 56 into the hole 38 in the package 30.

Figure 7:
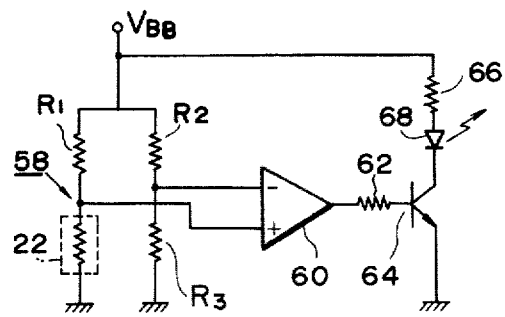
FIG. 7 is a schematic diagram of a circuit for detecting diaphragm breakage.

Referring to FIG. 7, a breakage detector circuit is shown as being connected to a detecting element 22 on the diaphragm. In this particular circuit, the detecting element and three other resistors R1, R2, R3 constitute a resistor bridge 58 to the input of which is applied a predetermined voltage Vbb. The output of the bridge 58 is connected to a comparator 60 whose output is input through a resistor 62 to the base of a power transistor 64. The output of this transistor 64 is connected to the voltage source Vbb through a resistor 66 and a light emitting diode 68 as an indicating element. If this circuit is set so that the output of the bridge circuit 58 is zero under normal conditions, an output of the bridge circuit due to breakage of the detecting element 22 results, with very high sensitivity; this causes the transistor 64 to turn on thereby illuminating the diode 68. Thus, if the light emitting diode 68 is provided near the driver's seat, the driver can be alerted to any breakage of the diaphragm and react accordingly.

Besides this warning indication, the breakage detector circuit can be used in such a way that the output of the breakage detector circuit causes the semiconductor sensor, whose diaphragm is broken, to switch a control system to the input of another sensor in order to maintain control for safe driving of an automobile.

As described above, according to the present invention, the combination of the breakage detector member provided around and on the semiconductor diaphragm and the detector circuit connected to the detecting element allows early breakage detection of the diaphragm, thereby solving the problem within the prior art described hereinabove.

Although the present invention has been shown and described with reference to some preferred embodiments and modifications thereof, it should be understood that various other alternations in the form and the content of any particular embodiment may be made without departing from the scope of the invention.

What is claimed is:

1. A pressure sensor including a sealed package having an inside space, a semiconductor block, a portion of which is in the form of a diaphragm, said semiconductor block including a circumferential support defining the periphery of said diaphragm and bonded to the inside of said package and a pressure-sensitive element including at least one diffused resistor layer formed in a surface of said diaphragm;

a diaphragm breakage detecting element comprising an electric conductor filament formed integrally in the surface of said diaphragm in an electrically insulated relationship to said at least one diffused resistor layer in a part of said diaphragm subject to a relatively large stress, the conductor filament having substantially the same material strength as the diaphragm, said conductor filament being provided zigzagging back and forth laterally across the boundary between said diaphragm and said circumferential support while following around the boundary;

said block with said pressure-sensitive element and said diaphragm breakage detecting element being confined within the inside space of said package and bonded to the inside of said package so that said diaphragm, said pressure-sensitive element and said diaphragm breakage detecting element are positioned spaced from the inside of said package and a hermetically sealed space is defined between the inside of said package and a front side of said block which includes said surface of said diaphragm, said space being adapted to be kept at a predetermined reference pressure, said package having a hole bored therethrough at such a position that a fluid pressure subject to measurement can be introduced into the interior of said package through said hole so as to arrive at a back surface of said diaphragm.

2. The pressure sensor of claim 1, wherein said conductor filament is composed of a diffused layer.

3. The pressure sensor of claim 1, wherein said conductor filament is composed of an evaporated film.

4. The pressure sensor of claim 3, wherein said evaporated film is gold.

5. The pressure sensor of claim 3, wherein said evaporated film is aluminium.

6. The pressure sensor of claim 1, wherein said conductor filament is composed of a diffused layer and an evaporated film.

7. The pressure sensor of claim 6, wherein said evaporated film is gold.

8. The pressure sensor of claim 6, wherein said evaporated film is aluminium.

9. The pressure sensor of claim 1, wherein said conductor filament includes at least one U-shaped protrusion projecting radially inwards, reaching substantially the center of said diaphragm, for detecting diaphragm breakage at substantially the center thereof.

10. The pressure sensor of claim 1, wherein said conductor filament includes a plurality of spaced U-shaped protrusions projecting radially inwards and intersecting at their respective end portions with said at least one diffused resistor in an electrically insulated relationship.

11. The pressure sensor of claim 1, wherein said pressure-sensitive element is in the form of a square at the center of said diaphragm, and wherein said pressure-sensitive element further includes four lead strips electrically connected to respective corners of the square, two of said lead strips extending in parallel outwards, and the other two of said lead strips extending in parallel but in an opposite direction to that in which the former two lead strips extend.

12. The pressure sensor of claim 11, wherein said conductor filament includes two spaced U-shaped protrusions projecting radially inwards, each of which is disposed between and along two respective lead strips extending in parallel outwards.

13. The pressure sensor of claim 12, wherein said conductor filament includes four circumferentially spaced U-shaped protrusions projecting inwards, which surround said four lead strips, respectively, and which intersect at the end portions of said protrusions with the adjacent sides, respectively, of the square.

* * * * *